No. 896,134. PATENTED AUG. 18, 1908.
W. P. MEEKER.
BUILDING BLOCK.
APPLICATION FILED JAN. 25, 1906.
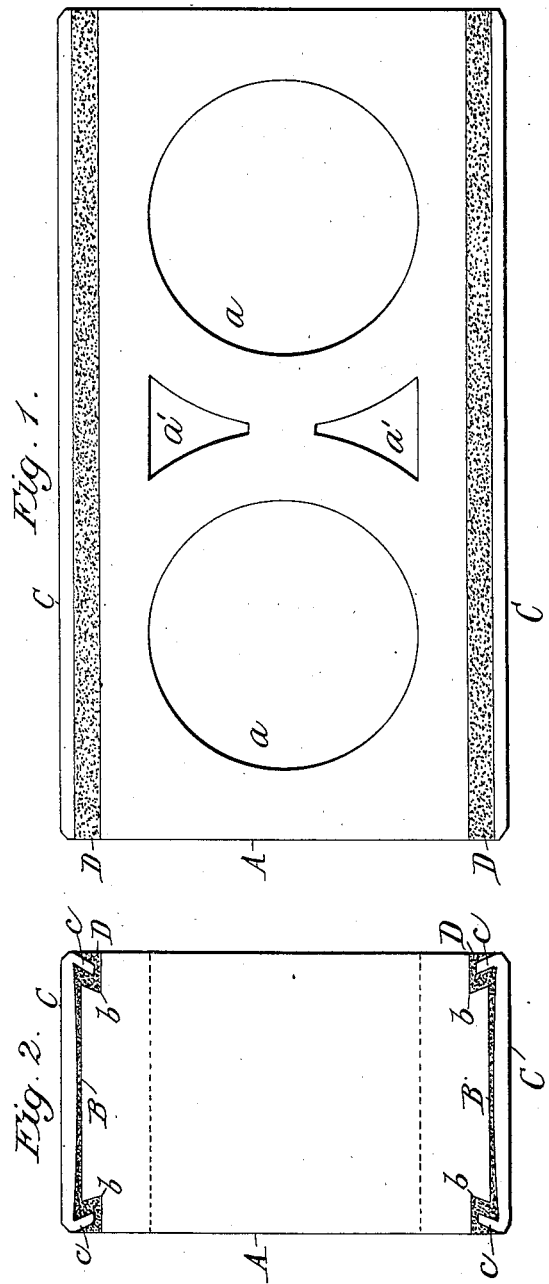
Witnesses
Edward Rowland.
W. D. Neilley.
Inventor
William Freemon Meeker
By his Attorney
Andrew Wilson.

UNITED STATES PATENT OFFICE.

WILLIAM PASSMORE MEEKER, OF NEWARK, NEW JERSEY.

BUILDING-BLOCK.

No. 896,134.   Specification of Letters Patent.   Patented Aug. 18, 1908.

Application filed January 25, 1906. Serial No. 297,728.

*To all whom it may concern:*

Be it known that I, WILLIAM PASSMORE MEEKER, a citizen of the United States, residing at Newark, Essex county, New Jersey, have invented certain new and useful Improvements in Building-Blocks, of which the following is a specification.

My invention relates to building-blocks wherein a finished face is mounted upon a body-block or base.

As is well understood in the art, vitreous or glass tiles, after they have been pressed or molded into shape, must be carefully and thoroughly annealed to produce in them that toughness which is essential to their durability. And it is impracticable to weld a glass facing-tile onto a burnt-clay brick backing and then anneal it; for the brick backing will prevent the equal application of heat to both sides of the glass, which is indispensable in annealing; and the unequal expansion and contraction of the glass face and the brick backing will crack and destroy the glass. Besides this, the pressure necessary to mold the glass and weld it to a brick backing is so great that the backing would be crushed and destroyed in the operation, particularly if it is hollow or recessed. Furthermore, if a plastic back or body-block of cement or similar material is molded onto an annealed glass face-tile having a locking portion on its back, the unavoidable variations in the size of the body block, which are due to the setting of the cement, will produce a strain upon the glass facing-tile which is liable to crack or break it or its attaching portions. I avoid these difficulties and secure a merchantable and durable, faced building-block by first forming an annealed, glass facing-tile provided with inturned edges, preparing a completed burnt-clay body-block, having a portion adapted to substantially fill the space between the inturned edges of the glass facing-tile, and then uniting the facing tile and body-block with a small portion of cement the change of which in setting will not be sufficient to produce any undue tension upon the facing-tile, the parts of the composite building-block thus formed being in a normal, unstrained condition, and adapted to continue so, in use, under all ordinary conditions and temperatures.

The particulars relating to my invention are hereinafter set forth.

In the drawings Figure 1 is a top view, and Fig. 2 an end view of one of my improved building-blocks; and Fig. 3 is a top view of a somewhat modified form of the same.

Similar parts are designated by similar reference letters in all the figures.

A is the body-block or base, which is preferably molded from brick clay and burned in the usual manner. This body-block A is pierced by primary openings $a$ $a$ and, if necessary, by secondary openings $a'$ $a'$, located so that there shall be approximately equal thicknesses of the brick material between the openings and the exterior side and end faces of the block. The sides of the block are provided with undercut rabbets $b$, $b$, thus forming central elevated faces B B with undercut edges, on each side of the body-block.

The finished faces of the block are formed with vitreous tile C C being inwardly turned edges $c$ $c$, the tile being secured to the body-block by means of suitable cement, D, placed between them and securely uniting them by gripping into the undercut rabbets $b$ $b$, and under the inturned tile-edges $c$ $c$. The completed block presents the advantages of a perforated brick body combining durability, cheapness, lightness and strength, and ornamental tile-faces which will present a uniform and finished tile surface when such blocks are laid in position one upon another. The main openings $a$ $a$ are so located that when joints are broken in laying the blocks, the openings in the superimposed blocks shall be substantially in line, thus forming ventilating flues or conduits for pipes or wires through the body of the wall or building parallel to the exterior surface thereof.

In Figs. 1 and 2 I have shown my block provided with two tile faces, while in Fig. 3 I have shown it provided with but one such face. And I wish it to be understood that my block may be provided with one or more finished faces, as may be desirable for the position in which it is to be placed. The block shown in Figs. 1 and 2 is particularly adapted for use in a wall which is but a single block in thickness and each side of which is to present a tile-finished surface. And the block shown in Fig. 3 is applicable where a finished lining is the principal object desired, as for instance in forming a lining in subways and similar places. When used in damp or moist places, the perforations in the blocks act as drains, through which water may be carried off, suitable drain connections being made at the base of the wall.

Having thus described my invention what

I claim and desire to secure by Letters Patent of the United States is:—

The combination, in a building-block, of a previously prepared brick-body provided with undercut rabbeted edges and with a large, round, transverse opening near each end and with a plurality of intermediate, triangular openings so located that there shall be approximately equal thicknesses of the material between the openings and the exterior side and end faces of the block, and a homogeneous, glass tile-face centrally-thickened and provided with beveled edges and with inwardly-bent laterally-tapering edge-flanges, and united to the body-block, parallel to the transverse openings, by a connecting cement, the space between the edges of the inturned flanges being wider than the undercut face of the body block.

WILLIAM PASSMORE MEEKER.

Witnesses:
WM. D. NEILLEY,
WILLIAM H. MOHR.